US007118050B1

(12) United States Patent
Chen

(10) Patent No.: US 7,118,050 B1
(45) Date of Patent: Oct. 10, 2006

(54) SPRAYER WITH CHANGEABLE VOLUME

(76) Inventor: Chiang-Pei Chen, 3F, No. 80, Yiping Road, Taichung Hsien, Taiping City (TW)

(*) Notice: Subject to any disclaimer, the term of this patent is extended or adjusted under 35 U.S.C. 154(b) by 0 days.

(21) Appl. No.: 11/161,027

(22) Filed: Jul. 20, 2005

(51) Int. Cl.
*B05B 9/043* (2006.01)
*B05B 11/04* (2006.01)
*A01G 25/14* (2006.01)
*B65D 37/00* (2006.01)

(52) U.S. Cl. ...................... 239/328; 239/329; 239/332; 239/375; 222/92; 222/143

(58) Field of Classification Search ................ 239/328, 239/329, 332, 375, 302, 330; 222/92, 143, 222/93–95, 333; 220/666, 669–671
See application file for complete search history.

(56) References Cited

U.S. PATENT DOCUMENTS 3,726,443 A * 4/1973 Harris ........................ 222/333
4,592,492 A * 6/1986 Tidmore ..................... 222/209
5,607,082 A * 3/1997 Cracauer ..................... 222/95
5,636,791 A * 6/1997 Leer ........................... 239/142
5,667,101 A * 9/1997 Barrash et al. ............... 222/92
5,752,661 A * 5/1998 Lewis ......................... 239/153
6,431,406 B1 * 8/2002 Pruett ......................... 222/210
6,641,002 B1 * 11/2003 Gerenraich et al. .......... 222/333
6,763,973 B1 * 7/2004 Hudkins ........................ 222/1
2002/0113101 A1 * 8/2002 Skillern .................. 224/148.2

* cited by examiner

*Primary Examiner*—David A. Scherbel
*Assistant Examiner*—Darren Gorman
(74) *Attorney, Agent, or Firm*—Alan D. Kamrath; Nikolai & Mersereau, P.A.

(57) ABSTRACT

A sprayer with a changeable volume includes a container, a pump, a first pipe, a second pipe and a nozzle. The container includes an upper wall and a lower wall. The upper wall can be compressed while not containing water and extensible for containing water. The lower wall is connected to the upper wall. The pump is put in a space defined in the lower wall. The first pipe is led to the pump from a space defined in the upper wall. The second pipe is led to the exterior of the container from the pump. The nozzle is connected to the second pipe.

16 Claims, 10 Drawing Sheets

3 - 3

7 - 7

SPRAYER WITH CHANGEABLE VOLUME

BACKGROUND OF INVENTION

1. Field of Invention

The present invention relates to a sprayer and, more particularly, to a sprayer with a changeable volume.

2. Related Prior Art

Referring to FIGS. 9 and 10, a conventional sprayer includes a container 60 formed with a handle 63. The container 60 includes a first space 61, a second space 62 communicated with the first space 61 through a channel (not numbered) and a port 621 communicated with the second space 62. Water can be filled in and poured from the second space 62 through the port 621. The port 621 can be closed of a cap 90. A pump 70 is put in the first space 61. A pipe (not numbered) is led into the second space 62 from the pump 70 through the channel. Then, the channel is sealed. An outlet device 80 includes a pipe 81 connected to the pump 70, a nozzle 83 connected to the pipe 81 and a handle 82 operatively connected to the nozzle 83. In use, water is filled in the container 60 and then sprayed from the nozzle 83. After use, water is poured from the container 60. Being made of a thermosetting plastic, the container 60 occupies a large space although not containing any water. This wastes space and causes inconvenience for shipment and storage. This entails a high cost in shipment.

The present invention is therefore intended to obviate or at least alleviate the problems encountered in the prior art.

SUMMARY OF INVENTION

According to the present invention, there is disclosed a sprayer with a changeable volume. The sprayer includes a container, a pump, a first pipe, a second pipe and a nozzle. The container includes an upper wall and a lower wall. The upper wall can be compressed while not containing water and extensible for containing water. The lower wall is connected to the upper wall. The pump is put in a space defined in the lower wall. The first pipe is led to the pump from a space defined in the upper wall. The second pipe is led to the exterior of the container from the pump. The nozzle is connected to the second pipe.

An advantage of the sprayer according to the present invention is the convenience in shipment and storage of the sprayer, because the upper wall can be compressed and can occupy a small space.

Other advantages and novel features of the invention will become more apparent from the following detailed description in conjunction with the drawings.

BRIEF DESCRIPTION OF DRAWINGS

The present invention will be described through detailed description of two embodiments referring to the drawings.

DETAILED DESCRIPTION OF EMBODIMENTS

Referring to FIGS. 1 through 5, there is shown a sprayer with a changeable volume according to a first embodiment of the present invention. The sprayer includes a container 10 and a pump 20.

Figure 1:
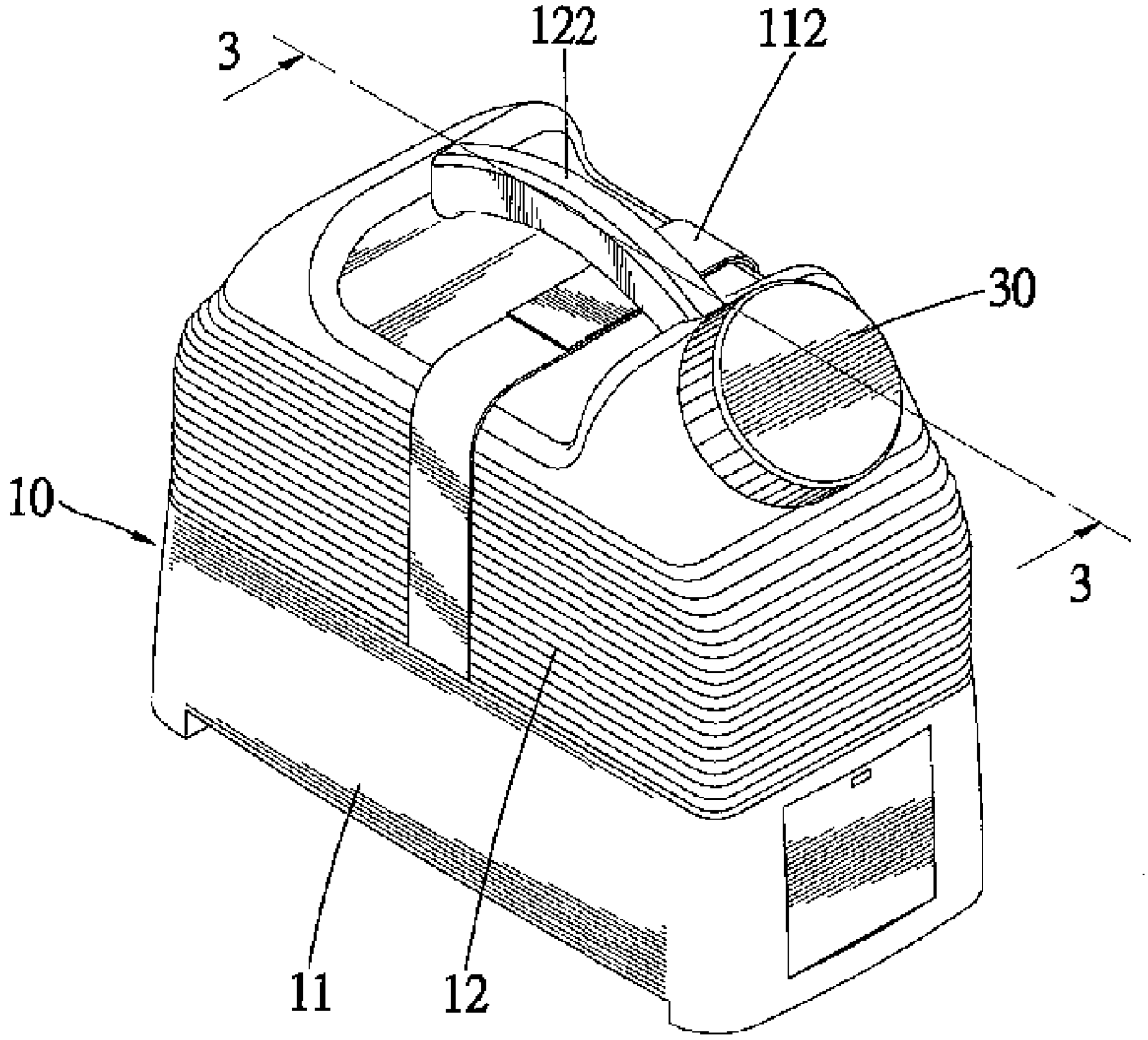
FIG. 1 is a perspective view of a sprayer with a changeable volume according to the first embodiment of the present invention.
Figure 2:
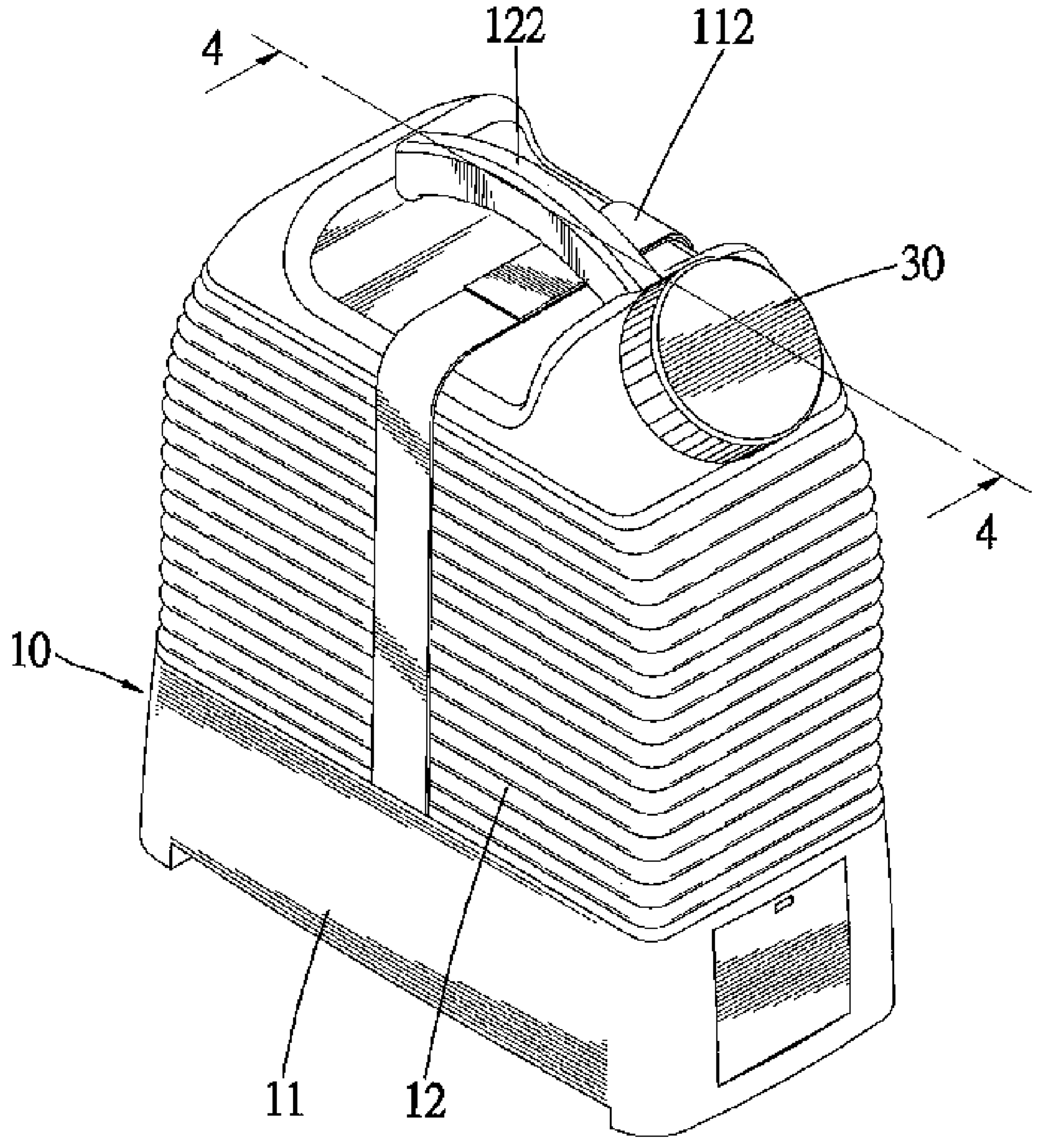
FIG. 2 is another perspective view of the sprayer of FIG. 1, showing the sprayer extended.
Figure 3:
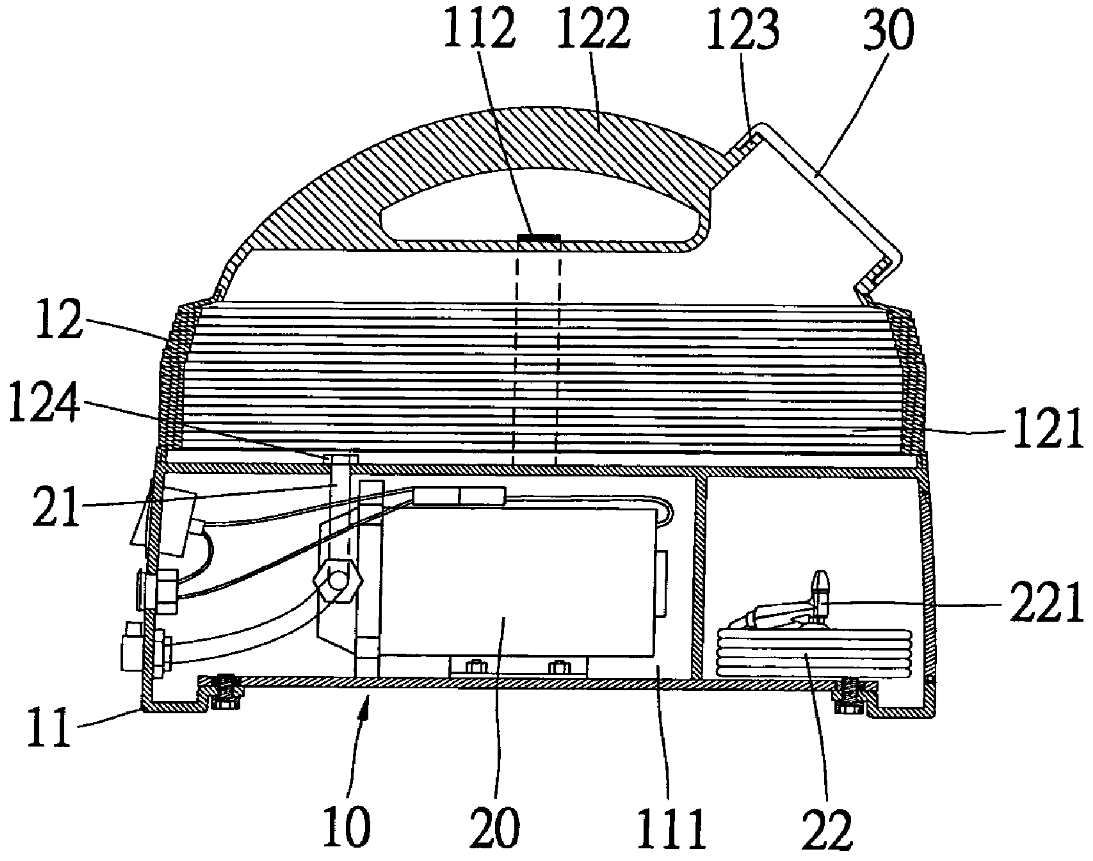
FIG. 3 is a cross-sectional view taken along a line 3—3 in FIG. 1.
Figure 4:
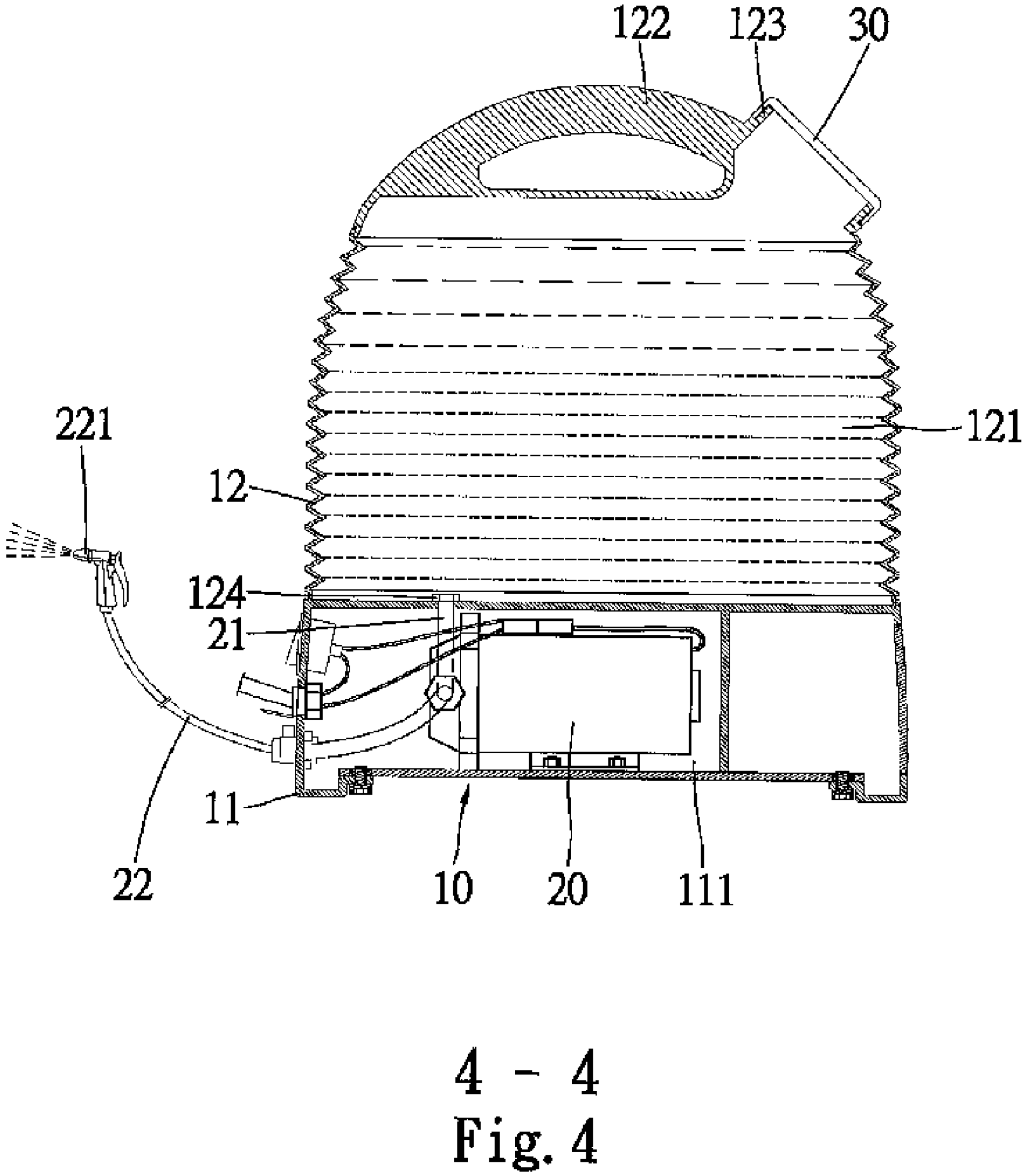
FIG. 4 is a cross-sectional view taken along a line 4—4 in FIG. 2.

Referring to FIGS. 3 and 4, the container 10 includes a bottom portion (not numbered), a lower wall 111 formed on the bottom portion, an upper wall 12 formed on the lower wall 11, a top portion (not numbered) formed on the upper wall 12, and a handle 122 formed on the top portion.

The lower wall 111 includes a rigid structure, and defines a space 111 for containing the pump 20.

The upper wall 12 includes a pleated structure, and defines a space 121 for containing water. The volume of the space 121 is changeable because of the pleated structure of the upper wall 12. A strap 112 includes two ends connected to the lower wall 111 in order to restrain the upper wall 12.

Water can be filled in and poured from the space 121 through a port 123 defined in the top portion. The port 123 can be closed of a cover 30.

A first pipe 21 is led to the pump 20 from an inlet 124 in the space 121. A second pipe 22 is led to the exterior of the container 10 from the pump 20. A nozzle 221 is connected to the second pipe 22.

Referring to FIG. 3, with the pleated structure, the upper wall 12 is compressed and occupies a small space while not containing any water. This saves space and causes convenience for shipment and storage. This involves a low cost in shipment. The second pipe 22 is withdrawn.

Referring to FIG. 4, with the pleated structure, the upper wall 12 is extended and provides a large space for containing water. The second pipe 22 is extended.

Figure 5:
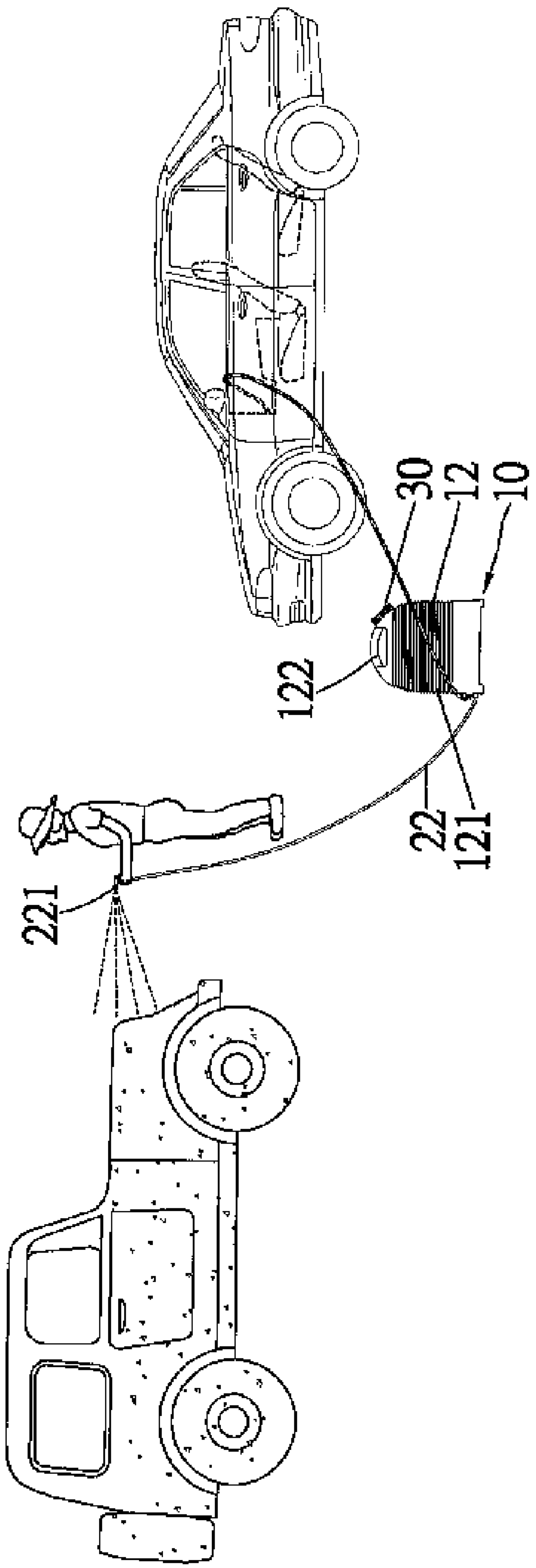
FIG. 5 is a side view of the sprayer shown in FIG. 1, showing the sprayer in use.

Referring to FIG. 5, the sprayer can be used in washing cars.

Figure 6:
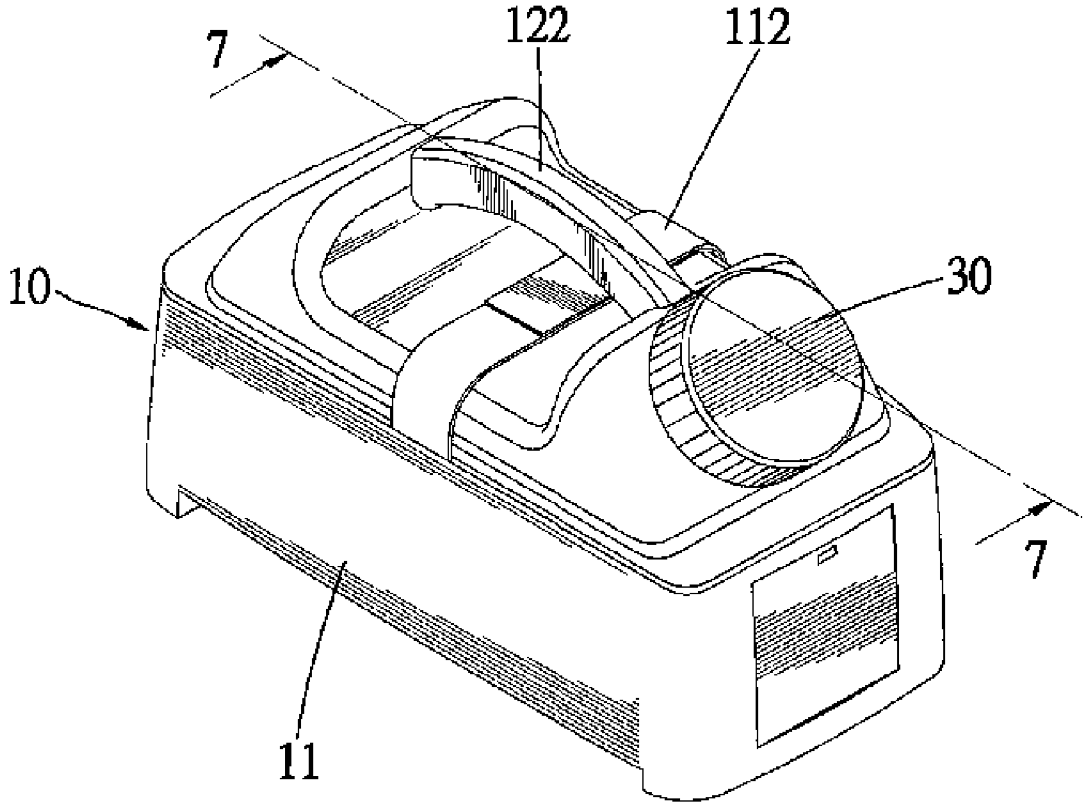
FIG. 6 is a perspective view of a sprayer with a changeable volume according to the second embodiment of the present invention.
Figure 7:
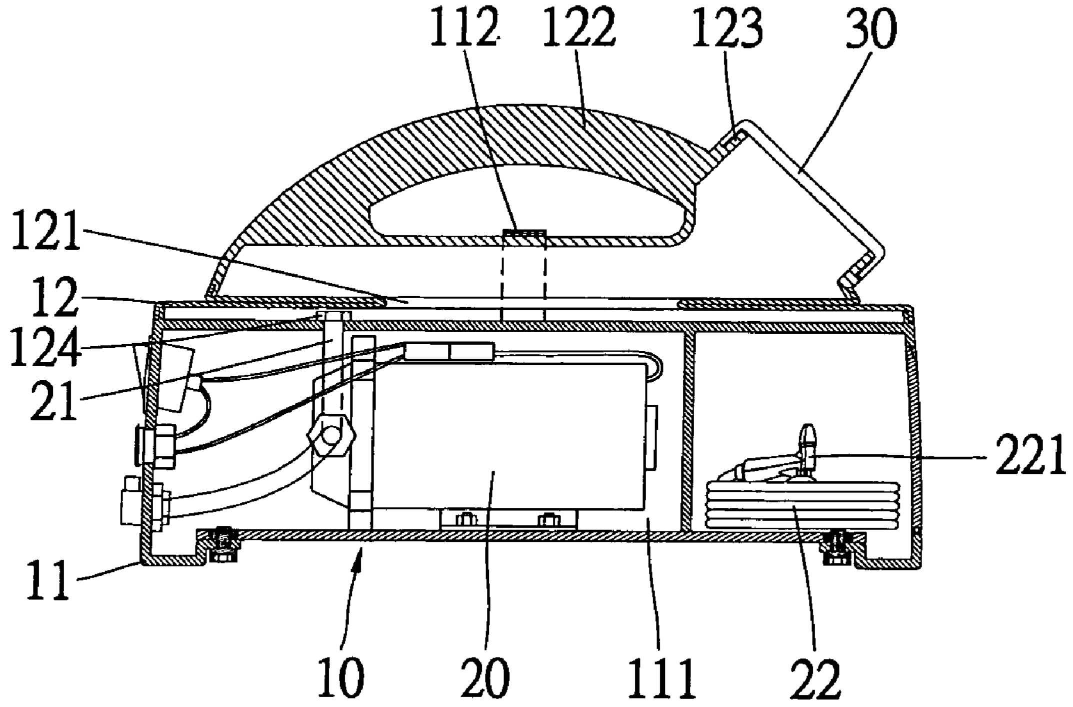
FIG. 7 is a cross-sectional view taken along a line 7—7 in FIG. 6.
Figure 8:
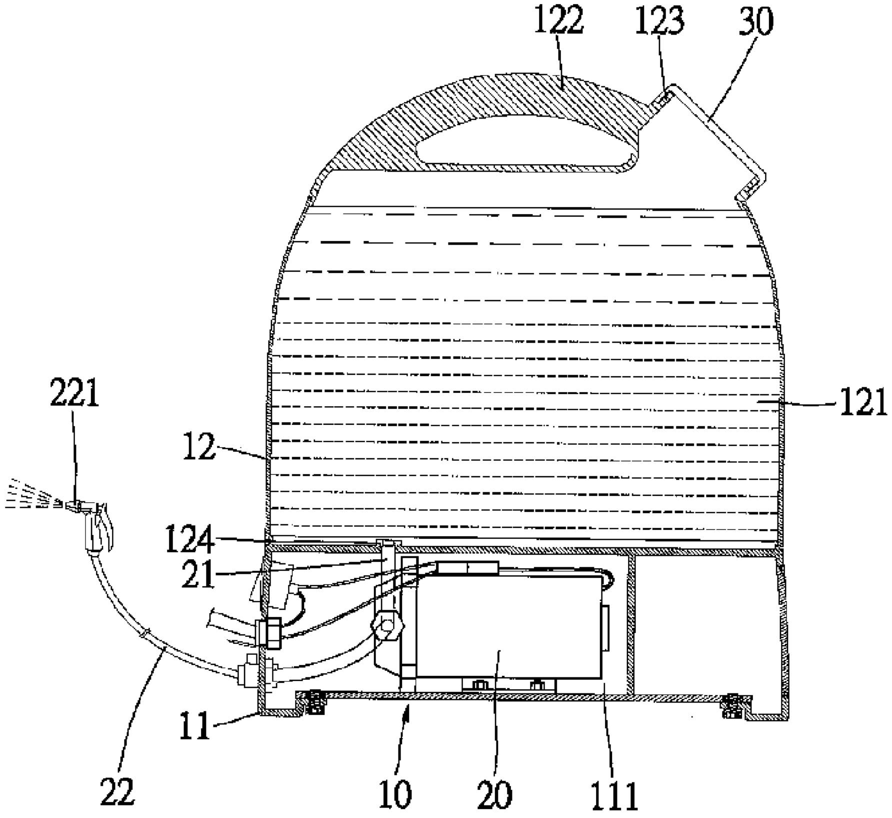
FIG. 8 is similar to FIG. 7 but shows the sprayer extended.
Figure 9:
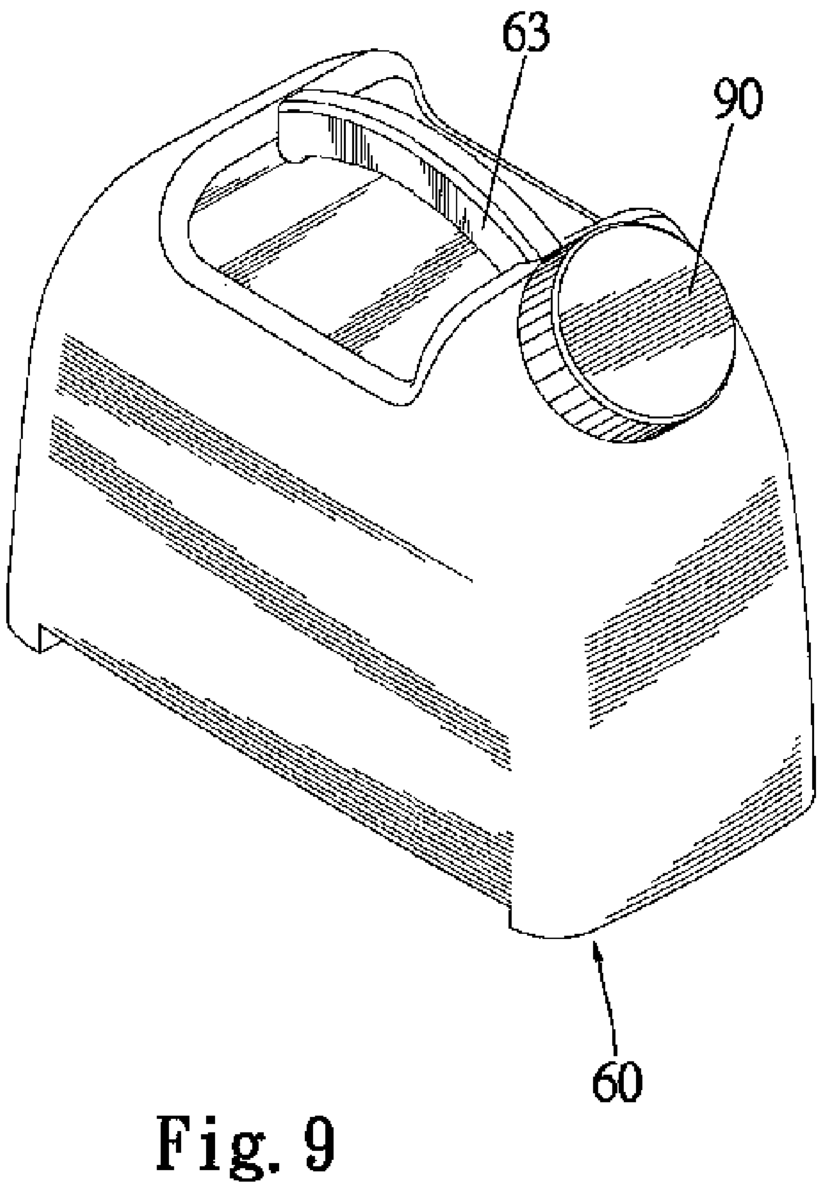
Fig. 9 PRIOR ART
FIG. 9 is a perspective view of a conventional sprayer.
Figure 10:
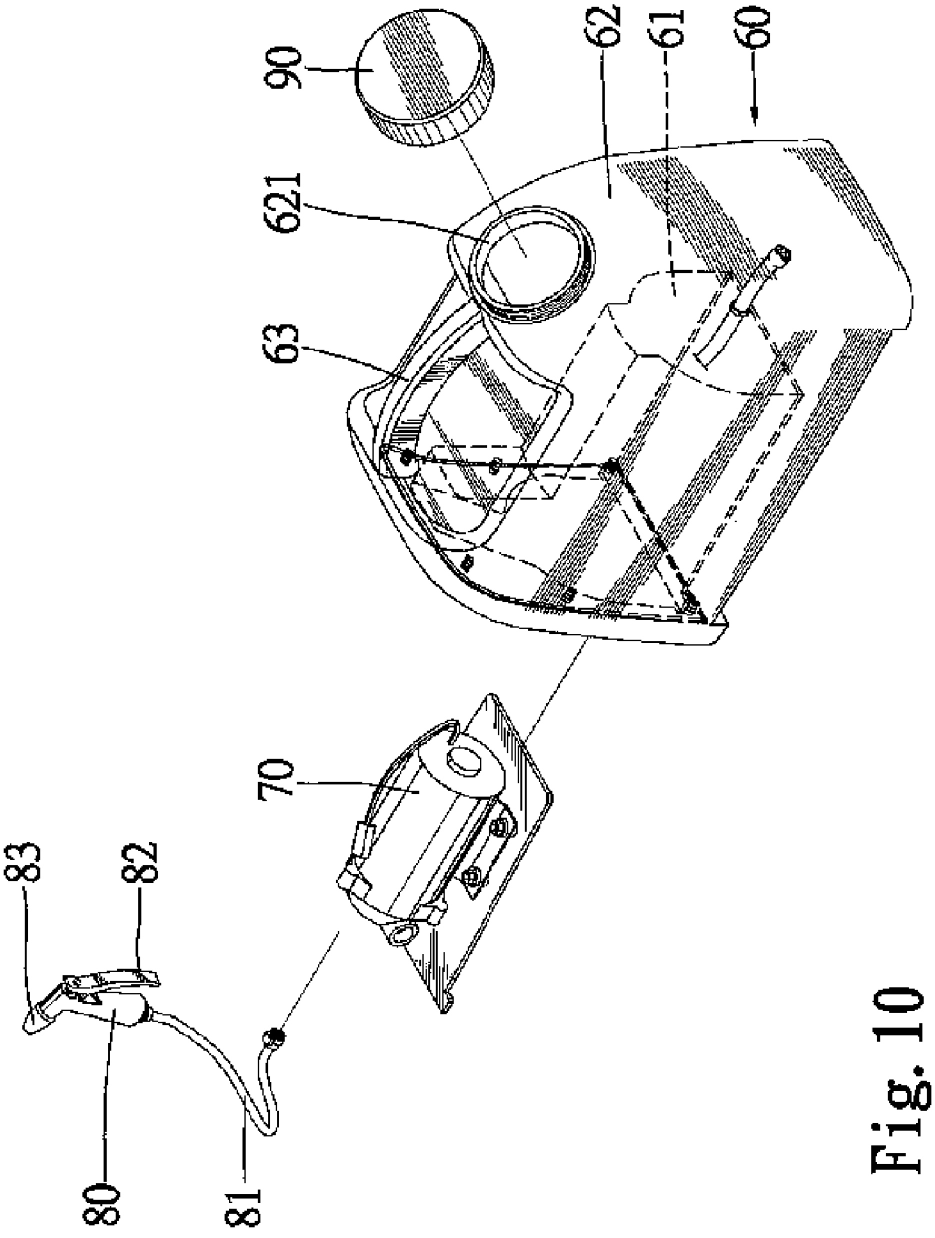
Fig. 10 PRIOR ART
FIG. 10 is an exploded view of the sprayer shown in FIG. 9.

FIGS. 6 through 8, there is shown a sprayer according to a second embodiment of the present invention. The second embodiment is similar to the first embodiment except that the upper wall 12 includes an inflatable structure instead of the pleated structure. To this end, the upper wall 12 can be made of any proper material such as that of a tube of a tire.

Referring to FIG. 7, with the inflatable structure, the upper wall 12 is compressed and occupies a small space while not containing any water. The upper wall 12 is thick.

Referring to FIG. 8, with the inflatable structure, the upper wall 12 is extended and provides a large space for containing water. The upper wall 12 becomes thin.

The present invention has been described through the detailed description of the embodiments. Those skilled in the art can derive variations from the embodiments without departing from the scope of the present invention. Therefore, the embodiments shall not limit the scope of the present invention defined in the claims.

What is claimed is:

1. A sprayer with a changeable volume comprising:

a container comprising an upper wall and a lower wall connected to the upper wall, with the lower wall being a rigid structure including a bottom peripheral partition extending upwardly to a bottom height from a bottom partition, with the upper wall including an upper peripheral partition extending downwardly from an upper partition, with the bottom and upper peripheral partitions of the upper and lower walls being interconnected to define a space for containing water, with the upper peripheral partition of the upper wall being expandable between a compressed height less than the bottom height and an extended height greater than the bottom height;

a pump in the space defined in the lower wall and within the bottom height;

a first pipe led to the pump from the space;

a second pipe led to the exterior of the container from the pump; and a nozzle connected to the second pipe.

2. The sprayer according to claim 1 wherein the upper peripheral partition of the upper wall comprises a pleated structure.

3. The sprayer according to claim 1 wherein the upper peripheral partition of the upper wall comprises an inflatable structure.

4. The sprayer according to claim 1 wherein the container comprises a handle formed on the upper partition of the upper wall and independent of the lower wall and the upper peripheral partition.

5. The sprayer according to claim 1 wherein the container comprises a port for water.

6. The sprayer according to claim 5 comprising a cover for closing the port.

7. A sprayer with a changeable volume comprising:

a container comprising an upper wall and a lower wall connected to the upper wall, with the upper wall of the container being changeable between an extended position and a compressed position relative to the lower wall, with the container with the upper wall in the compressed position occupying less space than with the upper wall in the extended position;

a pump in the lower wall;

a first pipe led to the pump from the container;

a second pipe led to the exterior of the container from the pump; and a nozzle connected to the second pipe, wherein the container comprises a strap for releasably restraining the upper wall from changing from the compressed position into the extended position relative to the lower wall.

8. The sprayer according to claim 7 wherein the upper wall comprises a pleated structure.

9. The sprayer according to claim 7 wherein the upper wall comprises an inflatable structure.

10. The sprayer according to claim 7 wherein the container comprises a handle formed on the upper wall and independent of the lower wall, with the handle being spaced greater from the lower wall with the upper wall in the extended position than with the upper wall in the compressed position.

11. The sprayer according to claim 7 wherein the container comprises a port for water.

12. The sprayer according to claim 11 comprising a cover for closing the port.

13. The sprayer according to claim 1 wherein the lower wall includes a top sheet spaced from the bottom partition, with the bottom peripheral partition extending downwardly from the top sheet, with the space defined between the upper wall and the top sheet of the lower wall, with the first pipe extending through the top sheet and in fluid communication with the space.

14. The sprayer according to claim 13 wherein the second pipe can be disconnected and stored within the lower wall below the top sheet.

15. The sprayer according to claim 1 further comprising, in combination:

a device removeably restraining the upper peripheral partition from expanding from the compressed height toward the extended height.

16. The sprayer according to claim 15 wherein the restraining device comprises a strap extended from the lower wall around the upper wall.

* * * * *